(12) United States Patent
Jing et al.

(10) Patent No.: US 10,645,140 B2
(45) Date of Patent: May 5, 2020

(54) METHOD FOR PROCESSING TRANSCODING TASK, SYSTEM AND TASK MANAGEMENT SERVER

(71) Applicant: WANGSU SCIENCE & TECHNOLOGY CO., LTD., Shanghai (CN)

(72) Inventors: Rui Jing, Shanghai (CN); Liang Ma, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 23 days.

(21) Appl. No.: 16/094,088

(22) PCT Filed: May 9, 2018

(86) PCT No.: PCT/CN2018/086182
§ 371 (c)(1),
(2) Date: Oct. 16, 2018

(87) PCT Pub. No.: WO2019/196158
PCT Pub. Date: Oct. 17, 2019

(65) Prior Publication Data
US 2019/0312922 A1   Oct. 10, 2019

(30) Foreign Application Priority Data
Apr. 9, 2018  (CN) .......................... 2018 1 0312228

(51) Int. Cl.
*G06F 15/16* (2006.01)
*H04L 29/06* (2006.01)
(Continued)

(52) U.S. Cl.
CPC .......... *H04L 65/80* (2013.01); *H04L 43/0817* (2013.01); *H04L 65/607* (2013.01); *H04L 67/1034* (2013.01); *H04N 19/40* (2014.11)

(58) Field of Classification Search
CPC ... H04L 65/80; H04L 65/607; H04L 67/1034; H04L 43/0817; H04N 19/40
(Continued)

(56) References Cited

U.S. PATENT DOCUMENTS

2003/0158913 A1*  8/2003  Agnoli ................... H04L 29/06
                                                                 709/219
2010/0223044 A1*  9/2010  Gisby ..................... H04M 3/56
                                                                    704/3
(Continued)

FOREIGN PATENT DOCUMENTS

CN       102143358 A      8/2011
CN       103167138 A      6/2013
(Continued)

OTHER PUBLICATIONS

The European Patent Office (EPO) The Extended European Search Report for 18863796.1 dated Nov. 18, 2019 8 Pages.
(Continued)

*Primary Examiner* — Philip B Tran
(74) *Attorney, Agent, or Firm* — Anova Law Group, PLLC

(57) ABSTRACT

A method for processing a transcoding task includes: receiving the transcoding task created by a streaming media server, and dispatching the transcoding task to a transcoding server to allow the transcoding server to execute the transcoding task; detecting an execution status of the transcoding task in the transcoding server, when it is detected that the transcoding task is terminated, feeding back, to the streaming media server, a notification message signifying a termination of a transcoding process, to allow the streaming media server to determine whether to re-create the transcoding task; and if the streaming media server re-creates the transcoding task, receiving the re-created transcoding task sent by the streaming media server, and dispatching the re-created transcoding task to the transcoding server to allow the transcoding server to re-execute the transcoding task.

18 Claims, 4 Drawing Sheets

(51) Int. Cl.
  *H04N 19/40*  (2014.01)
  *H04L 12/26*  (2006.01)
  *H04L 29/08*  (2006.01)

(58) Field of Classification Search
  USPC .................................................. 709/219, 231
  See application file for complete search history.

(56) References Cited

U.S. PATENT DOCUMENTS

| | | | | |
|---|---|---|---|---|
| 2011/0265134 | A1* | 10/2011 | Jaggi | H04N 21/234309 |
| | | | | 725/109 |
| 2014/0344415 | A1* | 11/2014 | Liu | H04N 19/162 |
| | | | | 709/219 |
| 2015/0341407 | A1* | 11/2015 | Agnoli | H04N 21/00 |
| | | | | 709/219 |
| 2017/0026311 | A1* | 1/2017 | Wang | H04N 19/436 |

FOREIGN PATENT DOCUMENTS

| | | | |
|---|---|---|---|
| CN | 104159127 | A | 11/2014 |
| CN | 105868009 | A | 8/2016 |
| CN | 105898318 | A | 8/2016 |
| WO | 2009054139 | A1 | 4/2009 |

OTHER PUBLICATIONS

The State Intellectual Property of The People's Republic of China (SIPO) International Search Report and Written Opinion for PCT/CN2018/086182 dated Aug. 6, 2018 9 Pages.

* cited by examiner

METHOD FOR PROCESSING TRANSCODING TASK, SYSTEM AND TASK MANAGEMENT SERVER

CROSS-REFERENCES TO RELATED APPLICATIONS

This application is a national phase entry under 35 U.S.C § 371 of International Application No. PCT/CN2018/086182 filed on May 9, 2018, which claims priority of Chinese Patent Application No. 2018103122282, filed with the State Intellectual Property Office of P. R. China on Apr. 9, 2018, the entire contents of all of which are incorporated herein by reference.

FIELD OF THE DISCLOSURE

The present disclosure generally relates to the field of Internet technology and, more particularly, relates to a method for processing a transcoding task, a system, and a task management server thereof.

BACKGROUND

With the continuous development of Internet technology, there are more and more audio/video resources in the network. At present, an original audio/video resource can be sent to a streaming media server after encoding. Before an audio/video resource in the streaming media server is provided to a user for watching, the audio/video resource may be converted by a transcoding server into a format recognizable by the client terminal.

In the process of transcoding an audio/video resource, the transcoding server may experience various abnormal situations that may cause the transcoding process to fail. For example, in the situations of a continuous decoding failure, a continuous encoding failure, etc., the transcoding server may not complete the normal audio/video decoding process, so that the user cannot watch the corresponding audio/video resource in time.

BRIEF SUMMARY OF THE DISCLOSURE

The objective of the present disclosure is to provide a method for processing a transcoding task, a system, and a task management server thereof, that may complete a decoding process in time.

To achieve the above objective, in one aspect, the present disclosure provides a method for processing a transcoding task. The method includes: receiving the transcoding task created by a streaming media server, and dispatching the transcoding task to a transcoding server to allow the transcoding server to execute the transcoding task; detecting an execution status of the transcoding task in the transcoding server, when it is detected that the transcoding task is terminated, feeding back, to the streaming media server, a notification message signifying a termination of a transcoding process, to allow the streaming media server to determine whether to re-create the transcoding task; and if the streaming media server re-creates the transcoding task, receiving the re-created transcoding task sent by the streaming media server, and dispatching the re-created transcoding task to the transcoding server to allow the transcoding server to re-execute the transcoding task.

To achieve the above objective, in another aspect, the present disclosure further provides a task management server. The task management server comprises a memory and a processor, where the memory stores computer programs that, when executed by the processor, implement the above-described method.

To achieve the above objective, in another aspect, the present disclosure further provides a system for processing a transcoding task. The system comprises a streaming media server, a task management server, and a transcoding server, where: the streaming media server is configured to create the transcoding task, send the created transcoding task to the task management server, and, when receiving a notification message, signifying a termination of a transcoding process, sent by the task management server, determine whether to re-create the transcoding task; the task management server is configured to receive the transcoding task created by the streaming media server, dispatch the transcoding task to the transcoding server, detect an execution status of the transcoding task in the transcoding server, when it is detected that the transcoding task is terminated, feed back to the streaming media server the notification message signifying the termination of the transcoding process, if the streaming media server re-create the transcoding task, receive the re-created transcoding task sent by the streaming media server, and dispatch the re-created transcoding task to the transcoding server; and the transcoding server is configured to execute transcoding tasks dispatched by the task management server.

As can be seen from the above, in the technical solutions provided by the present disclosure, the task management server may dispatch and manage the transcoding tasks created by the streaming media server, and detect the execution status of a transcoding task in the transcoding server. Specifically, the streaming media server may create a transcoding task for an audio/video stream. After the transcoding task is sent to the task management server, the task management server may dispatch the transcoding task to a transcoding server according to the load balancing policy. Thereafter, the transcoding server may obtain the to-be-transcoded audio/video stream from the streaming media server according to the transcoding task, and start executing the transcoding task. During the transcoding process, when the transcoding task is terminated, the task management server may detect the termination activity and report a notification message of the termination of the transcoding task to the streaming media server. Thereafter, the streaming media server may determine whether the transcoding task of the audio/video stream needs to be re-created by detecting whether the connection of the audio/video stream of the transcoding task is disconnected. For example, if the connection of the audio/video stream is not disconnected, it indicates that the current task termination is an anomaly. The transcoding task of the audio/video stream may be then re-created, thereby continuing the transcoding process. If the connection of the audio/video stream is disconnected, it means that the transcoding task has completed properly, and there is no need to re-create the transcoding task. It can be seen from the above that the technical solutions provided by the present disclosure may detect and restore abnormal transcoding tasks in time, so as to ensure that the audio/video streams may complete the decoding process in time.

BRIEF DESCRIPTION OF THE DRAWINGS

To make the technical solutions in the embodiments of the present disclosure clearer, a brief introduction of the accompanying drawings consistent with descriptions of the embodiments will be provided hereinafter. It is to be understood that the following described drawings are merely some embodiments of the present disclosure. Based on the accompanying drawings and without creative efforts, persons of ordinary skill in the art may derive other drawings.

DETAILED DESCRIPTION

To make the objectives, technical solutions, and advantages of the present disclosure clearer, specific embodiments of the present disclosure will be made in detail with reference to the accompanying drawings.

Embodiment 1

Figure 1:
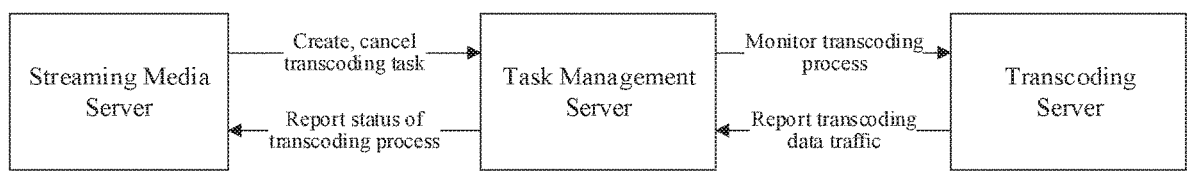
FIG. 1 is a schematic diagram of a system architecture for processing a transcoding task according to some embodiments of the present disclosure.

The present disclosure provides a method for processing a transcoding task, which may be applied to a task management server. Referring to FIG. 1, the task management server may be added to existing system architecture. The task management server may be connected with a streaming media server and a transcoding server, respectively. The streaming media server may store audio/video data, and the transcoding server may obtain audio/video data from the streaming media server and decode the obtained audio/video data.

Figure 2:
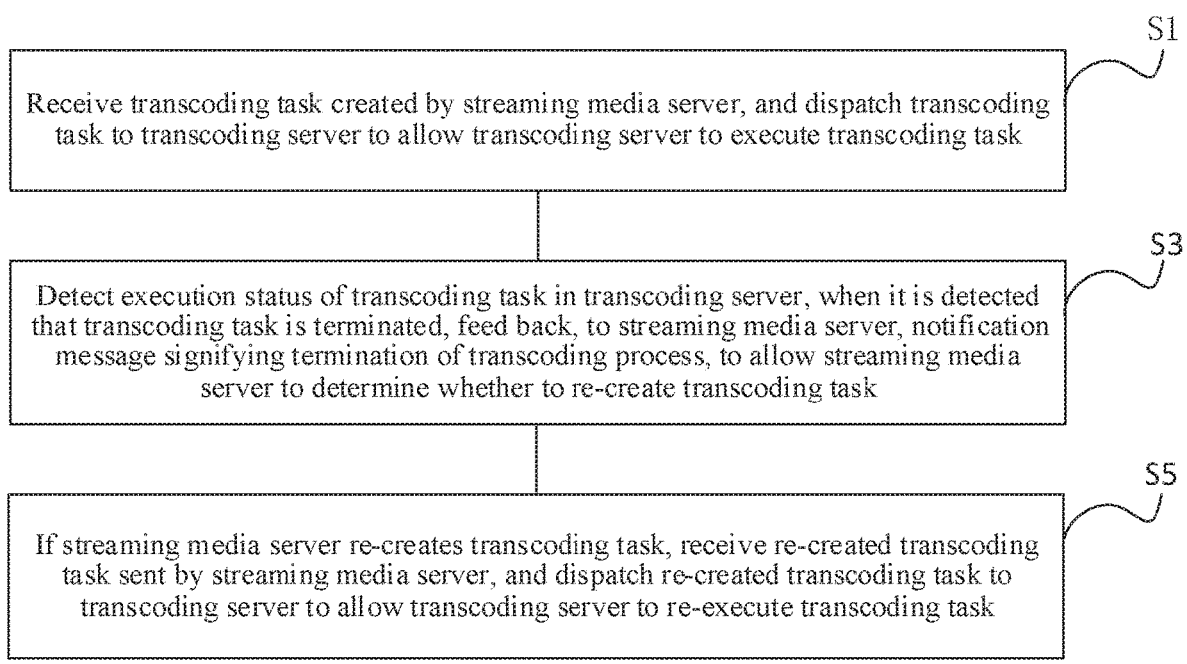
FIG. 2 is a flowchart of a method for processing a transcoding task according to some embodiments of the present disclosure.
Figure 3:
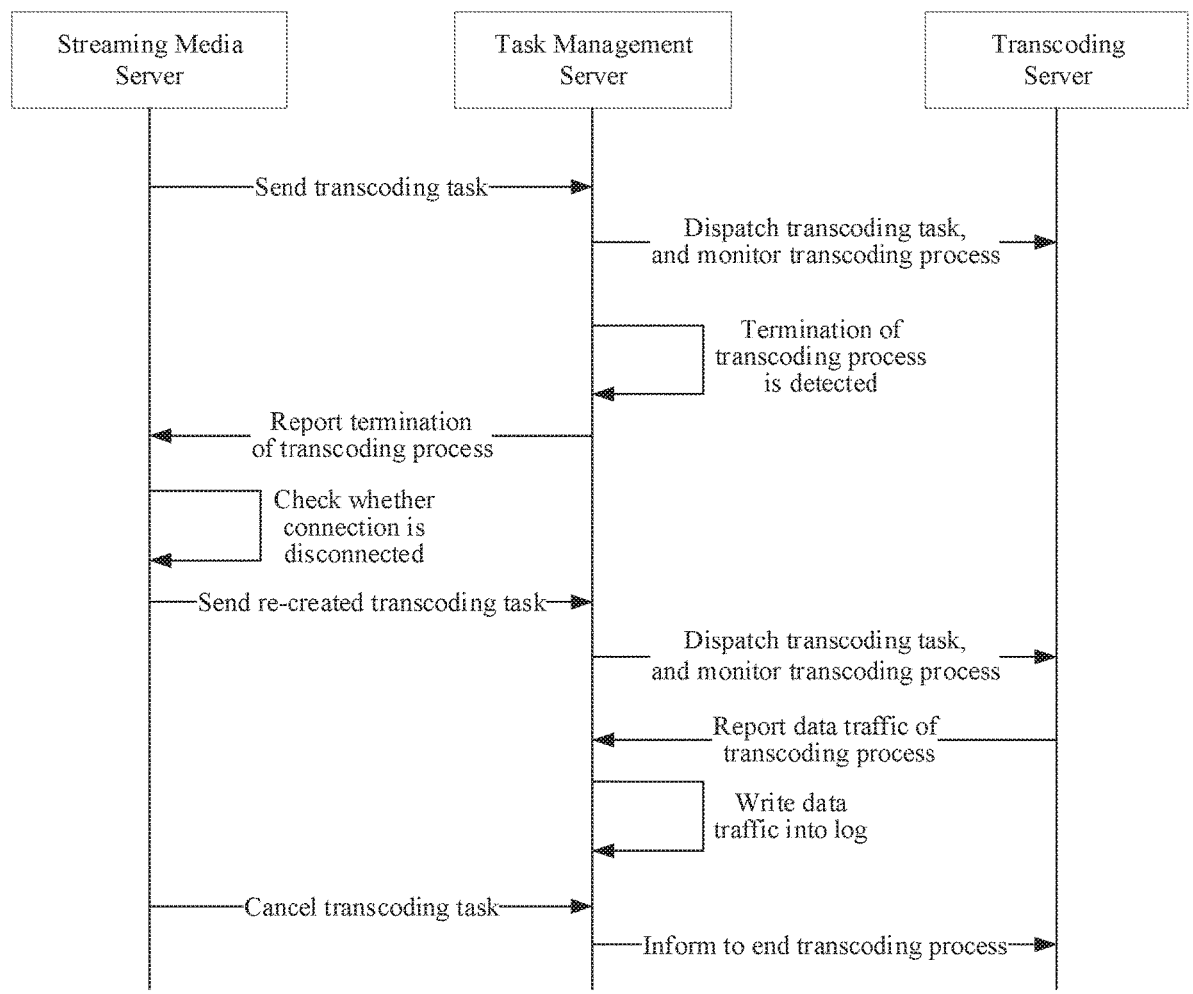
FIG. 3 is an interactive schematic diagram of a method for processing a transcoding task according to some embodiments of the present disclosure.

Referring to FIG. 2 and FIG. 3, a method for processing a transcoding task may include the following steps.

S1: Receive a transcoding task created by the streaming media server, and dispatch the transcoding task to a transcoding server, to allow the transcoding server to execute the transcoding task.

In the disclosed embodiments, the streaming media server may create a transcoding task, where the transcoding task may include an audio/video identifier. The audio/video identifier may point to an audio/video stream in the streaming media server. For instance, the streaming media server may receive live streaming data sent by a client terminal of a host. The live streaming data may be obtained by processing the original audio/video data collected by a microphone and camera of the host. Specifically, after collecting the original audio/video data, the microphone or camera of the host may encode the original audio/video data. After being encapsulated by the streaming media protocol, the encoded audio/video data may be pushed as an audio/video stream to the streaming media server. Thereafter, when a client terminal of a user wants to watch the audio/video stream from the host, a data acquisition request may be sent to the streaming media server. The streaming media server may create a transcoding task for the audio/video stream corresponding to the data acquisition request.

In the disclosed embodiments, after the streaming media server creates the transcoding task, the transcoding task may be sent to the task management server. The task management server may be responsible for dispatching and monitoring the transcoding task, to ensure that the transcoding process can be completed. Specifically, the task management server may establish connections with multiple transcoding servers. After receiving a transcoding task sent by the streaming media server, the task management server may dispatch the transcoding task to one of the transcoding servers in a load-balanced manner based on the current load of each transcoding server.

In the disclosed embodiments, a transcoding server may execute the transcoding task upon receiving the transcoding task dispatched by the task management server. Specifically, the transcoding server may start the transcoding process for the received transcoding task. Through the transcoding process, a series of operations related to the transcoding task may be performed. For instance, through the transcoding process, the transcoding server may extract the audio/video identifier from the transcoding task, and transmit a resource acquisition request including the audio/video identifier to the streaming media server, to allow the audio/video stream corresponding to the audio/video identifier to be pulled from the streaming media server. After the corresponding audio/video stream is pulled, the transcoding server may transcode the pulled audio/video stream through the transcoding process.

In the disclosed embodiments, the transcoding process may include multiple steps. Specifically, the transcoding server may correspondingly decode the audio/video stream according to the encoding mode of the audio/video stream. The original audio/video stream obtained through the decoding process may be processed by a filter. The filter may adjust parameters, such as video resolution and audio sampling rate, of the original audio/video stream obtained through the decoding process, to allow the adjusted audio/video stream to meet the requirements of the subsequent encoding process. The audio/video stream output by the filter may be then encoded according to the encoding mode supported by the client terminal of a user. The encoded audio/video stream may be pushed to the client terminal of the user, to finish the whole transcoding process.

S3: Detect an execution status of the transcoding task in the transcoding server, when it is detected that the transcoding task is terminated, feed back a notification message signifying the termination of the transcoding process to the streaming media server, to allow the streaming media server to determine whether to re-create the transcoding task.

In the disclosed embodiments, when the transcoding task is executed in the transcoding server, the execution of the transcoding task may be terminated abnormally due to various reasons. In light of this, after dispatching the transcoding task to the transcoding server, the task management server may create a status monitoring process. Through the status monitoring process, it may be detected whether the transcoding process for executing the transcoding task in the transcoding server has exited. In this way, the task management server may detect the execution status of the transcoding task in the transcoding server.

In the disclosed embodiments, if it is detected that the transcoding process for executing the transcoding task has exited, it indicates that the transcoding task is terminated. At this point, the task management server may feed back, to the streaming media server, a notification message signifying the termination of the transcoding process. The notification message may also include the audio/video identifier, so that the streaming media server may learn the transcoding task associated with which audio/video stream is terminated. After receiving the notification message, according to the audio/video identifier therein, the streaming media server may identify the audio/video stream whose transcoding process is terminated. At this point, the streaming media server may check whether the connection with the transcoding server for the audio/video stream associated with the transcoding task is disconnected. Normally, when the transcoding server starts to execute a transcoding task, it needs to establish a connection with the streaming media server, and acquire the to-be-transcoded audio/video stream through the connection. The connection will not be disconnected until the transcoding process is completed properly. If the transcoding process is terminated abnormally, the connection will still remain. For this reason, if the connection is not disconnected, it indicates that the transcoding task is terminated due to an anomaly. At this moment, the streaming media server may re-create a transcoding task directed to the audio/video stream, to re-transcode the audio/video stream. If the connection is already disconnected, it indicates that the transcoding task is completed properly. The transcoding task directed to the audio/video stream may be then ended.

S5: If the streaming media server re-creates the transcoding task, receive the re-created transcoding task sent by the streaming media server, and dispatch the re-created transcoding task to the transcoding server to allow the transcoding server to re-execute the transcoding task.

In the disclosed embodiments, if the streaming media server determines that the current transcoding task is terminated abnormally, the transcoding task may be re-created. The re-created transcoding task may be also sent to the task management server and dispatched to a transcoding server by the task management server, to allow the to-be-transcoded audio/video stream to be re-transcoded by the transcoding server.

In the disclosed embodiments, after the transcoding server transcodes the audio/video stream, the transcoded result may be transmitted to the live streaming server through data packets one by one, so that the live streaming server may send the transcoded audio/video stream to the client terminal of a user. After transmitting the data packets, the transcoding server may upload the data traffic of the transmitted data packets to the task management server. Thereafter, the task management server may write the received data traffic into a log to record the data traffic transmitted from the transcoding server to the live streaming server.

In some embodiments, when an audio/video stream is no longer watched by a user, or after an audio/video stream finishes playing, the streaming media server may send a task cancellation instruction to the task management server. The task cancellation instruction indicates that the current transcoding task may be ended. The task management server may then forward the task cancellation instruction to the transcoding server, to allow the transcoding server to cancel the transcoding process for executing the transcoding task. At the same time, the task management server may also cancel the status monitoring process for monitoring the execution of the transcoding process.

In some embodiments, when executing a transcoding task, the transcoding server may detect an anomaly in the transcoding process in various manners, and may also attempt to restore the transcoding process to normal. Specifically, the number of input channels of an audio/video stream pulled from the streaming media server by the transcoding server should be theoretically consistent with the number of output channels of the transcoded audio/video stream. However, in some transcoding scenarios, the transcoding process may have an anomaly, which results in an inconsistency between the number of output channels and the number of input channels. For example, for an audio stream in the number of input channels, the transcoding server does not complete the transcoding process properly, so that the audio stream is missing from the number of output channels. In this case, the audio/video stream obtained by the transcoding process is defective. Therefore, when the transcoding server detects an inconsistency between the number of input channels of a to-be-transcoded audio/video stream and the number of output channels of the already transcoded audio/video stream, it indicates that there is an anomaly in the transcoding process. The transcoding server may then exit the current transcoding process. After the task management server detects the anomaly subsequently, the task management server may inform the streaming media server, so that the transcoding task can be re-created.

In addition, the transcoding server may also monitor the situations of continuous transcoding failure. Specifically, the transcoding server may check the duration of a continuous transcoding failure. If a to-be-transcoded audio/video stream fails to be transcoded continuously for a specified period of time, it indicates that the transcoding process cannot be executed normally. The current transcoding process may be then exited at this moment, which signifies an abnormal termination of the transcoding process.

In some embodiments, certain situations, such as a change of the network transmission status or a change of the original audio/video stream, may cause inconsistency of configuration parameters of an audio/video stream that is successively pulled twice from the streaming media server by the transcoding server. If the same encoding approach is used to encode the data that have inconsistent configuration parameters, this will result in an anomaly in the encoded audio/video stream. In light of this, after pulling a to-be-transcoded audio/video stream, the transcoding server may parse the configuration parameters from the current to-be-transcoded audio/video stream. The currently parsed configuration parameters and the configuration parameters parsed last time are then compared. The configuration parameters may be parameters for describing information such as a video width and height, a video frame rate, an audio/video compression format, an audio sampling rate, and the like. The configuration parameters may be recorded in metadata, an AVC header (Advanced Video Coding header) or an AAC header (Advanced Audio Coding header) of an audio/video stream. If the currently parsed configuration parameters and the configuration parameters parsed last time are inconsistent, it indicates that the current audio/video stream has some change when compared to the audio/video stream that was pulled last time. In this case, the audio/video data currently cached in the decoder and the filter may be read, and the read audio/video data is encoded and sent to the live streaming server. The decoder and the filter are then reinitialized, and the to-be-transcoded audio/video stream is processed using the reinitialized decoder and filter. In this way, audio/video streams that have different configuration parameters may be processed based on the different initialization results, thereby ensuring that different audio/video streams may all complete the normal transcoding process.

Embodiment 2

Figure 4:
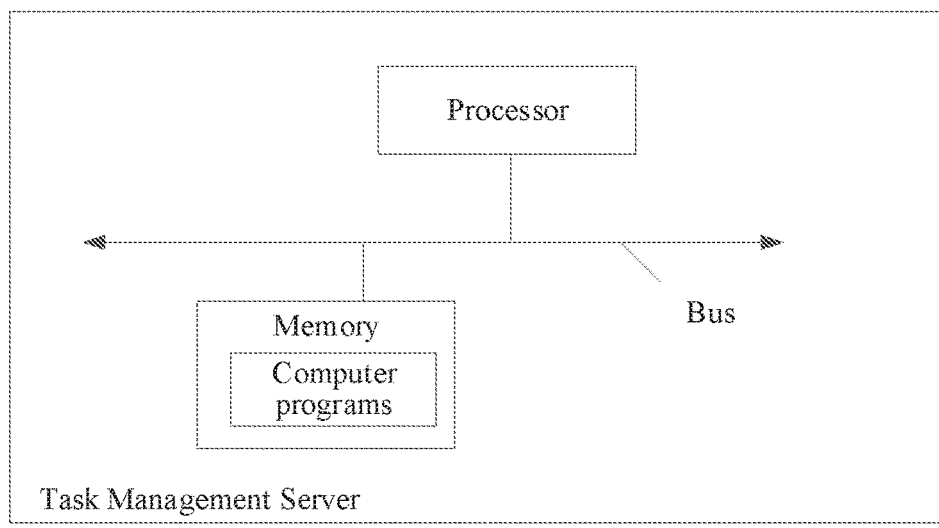
FIG. 4 is a schematic structural diagram of a task management server according to some embodiments of the present disclosure.

Referring to FIG. 4, the present disclosure further provides a task management server. The task management server includes a memory and a processor, where the memory stores computer programs that, when executed by the processor, may implement various methods and steps described in Embodiment 1.

In the disclosed embodiments, the memory may include physical devices, for storing information, that in general digitize the information and then store it in a medium using an electrical, magnetic, or optical means. The memory in the disclosed embodiments may also include: a device for storing information using electric energy, such as a RAM, a ROM, or the like; a device for storing information using magnetic energy, such as a hard disk, a floppy disk, a magnetic tape, a magnetic core memory, a magnetic bubble memory, and a USB flash drive; and a device for storing information in an optical approach, such as a CD or a DVD. It should be noted that computer storage media in other forms, such as a quantum memory, a graphene memory, are also contemplated.

In the disclosed embodiments, the processor may be implemented in various suitable manner. For instance, the processor may take the form of, for example, a microprocessor or processor and computer readable media for storing computer readable program code (e.g., software or firmware) executable by such microprocessor or processor, a logic gate, a switch, an Application Specific Integrated Circuit (ASIC), a programmable logic controller, or an embedded microcontroller, etc.

For the task management server provided by the disclosed embodiments in the present specification, its specific functions and achieved technical effects may refer to the foregoing method-related embodiments described in the present specification, which will not be repeated again here.

Embodiment 3

The present disclosure further provides a system for processing a transcoding task. Referring to FIG. 1, the system comprises a streaming media server, a task management server, and a transcoding server, where:

the streaming media server is configured to create the transcoding task, send the created transcoding task to the task management server, and, when receiving a notification message, signifying a termination of a transcoding process, sent by the task management server, determine whether to re-create the transcoding task;

the task management server is configured to receive the transcoding task created by the streaming media server, dispatch the transcoding task to the transcoding server, detect an execution status of the transcoding task in the transcoding server, when it is detected that the transcoding task is terminated, feed back to the streaming media server the notification message signifying the termination of the transcoding process, if the streaming media server re-create the transcoding task, receive the re-created transcoding task sent by the streaming media server, and dispatch the re-created transcoding task to the transcoding server; and the transcoding server is configured to execute transcoding tasks dispatched by the task management server.

In some embodiments, the task management server includes:

a process creation unit that is configured to create a status monitoring process, detect, through the status monitoring process, whether the transcoding process for executing the transcoding task in the transcoding server has exited, and when it is detected that the transcoding process for executing the transcoding task has exited, signify a termination of the transcoding task.

In some embodiments, the streaming media server includes:

a connection detecting unit that is configured to detect, after receiving the notification message, whether a connection with the transcoding server for an audio/video stream corresponding to the transcoding task is disconnected; and a decision-making unit that is configured to determine to, if the connection is not disconnected, re-create the transcoding task directed to the audio/video stream, if the connection is disconnected, end the transcoding task directed to the audio/video stream.

In some embodiments, the transcoding server includes:

a channel number comparison unit that is configured to detect a number of input channels of a to-be-transcoded audio/video stream and a number of output channels of an already transcoded audio/video stream, and compare the number of input channels and the number of the output channels; and a process exiting unit that is configured to exit a current transcoding process if the number of input channels and the number of output channels are inconsistent.

Figure 5:
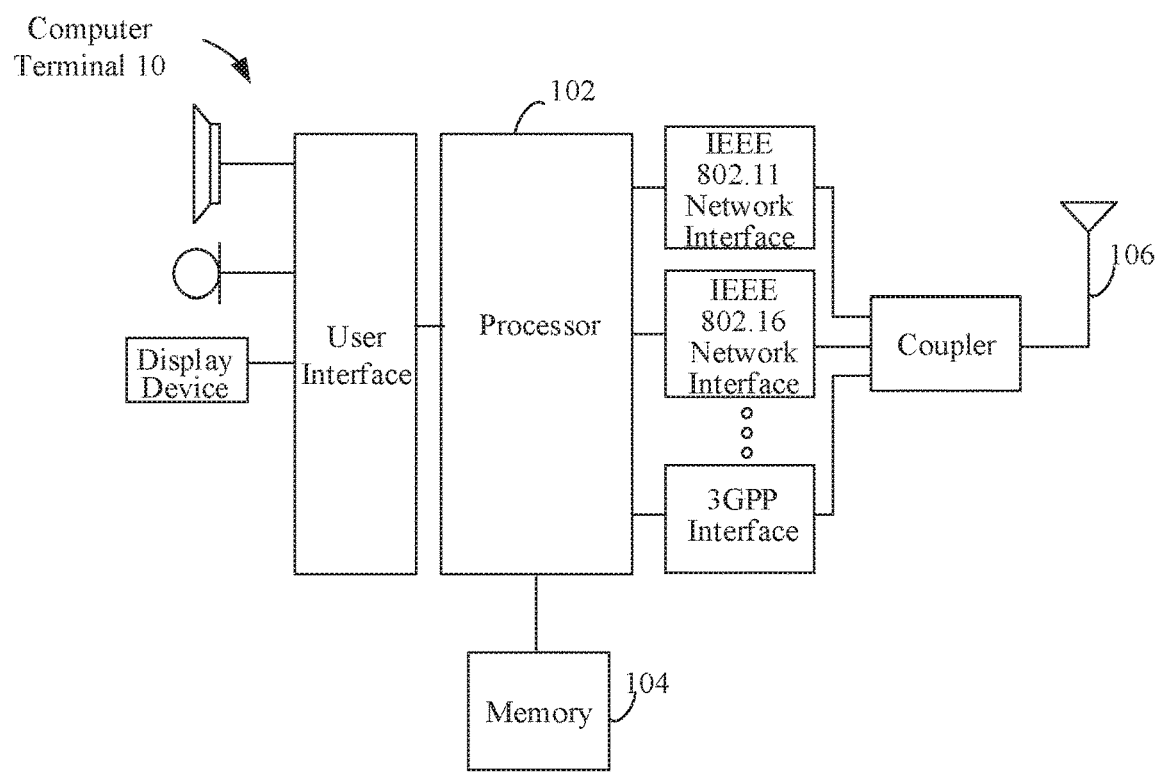
FIG. 5 is a schematic structural diagram of a computer terminal according to some embodiments of the present disclosure.

In some embodiments, the transcoding server comprises:

a configuration parameter processing unit that is configured to parse configuration parameters from a current to-be-transcoded audio/video stream, and compare currently parsed configuration parameters with configuration parameters parsed last time, if the currently parsed configuration parameters and the configuration parameters parsed last time are inconsistent, read audio/video data currently cached in a decoder and a filter, encode the read audio/video data, and sent the encoded audio/video data to the live streaming server; and an initialization unit that is configured to reinitialize the decoder and the filter, and process the to-be-transcoded audio/video stream using the reinitialized decoder and the reinitialized filter Referring to FIG. 5, in the present disclosure, the technical solutions of the disclosed embodiments may be applied to a computer terminal 10 shown in FIG. 5. The computer terminal 10 may include one or more (only one is shown in the figure) processors 102 (a processor 102 may include, but is not limited to, a processing device such as a microcontroller MCU or a programmable logic device FPGA), a memory 104 for storing data, and a transmission device 106 for communication purpose. It will be understood by those skilled in the art that the structure shown in FIG. 5 is provided by way of illustration, but not by way of limitation of the structures of the above-described electronic devices. For example, the computer terminal 10 may also include more or fewer components than those shown in FIG. 5, or have a different configuration than that shown in FIG. 5.

The memory 104 may be used to store software programs and modules of application software. The processor 102 implements various functional applications and data processing by executing software programs and modules stored in the memory 104. The memory 104 may include a high-speed random-access memory, and a non-volatile memory, such as one or more magnetic storage devices, flash memory, or other non-volatile solid-state memory. In some applications, the memory 104 may further include a memory remotely disposed with respect to the processor 102, which may be connected to the computer terminal 10 through a network. Examples of such network may include, but are not limited to, the Internet, an intranet, a local area network, a mobile communication network, and combinations thereof.

The transmission device 106 is configured to receive or transmit data via the network. The aforementioned specific examples of the network may include a wireless network provided by the communication provider of the computer terminal 10. In one application, the transmission device 106 includes a network interface controller (NIC). The transmission device 106 may be connected to other network devices through the base stations, so as to communicate with the Internet. In another application, the transmission device 106 may be a Radio Frequency (RF) module that is configured to communicate with the Internet via a wireless approach.

As can be seen from the above, in the technical solutions provided by the present disclosure, the task management server may dispatch and manage the transcoding tasks created by the streaming media server, and detect the execution status of a transcoding task in the transcoding server. Specifically, the streaming media server may create a transcoding task for an audio/video stream. After the transcoding task is sent to the task management server, the task management server may dispatch the transcoding task to a transcoding server according to the load balancing policy. Thereafter, the transcoding server may obtain the to-be-transcoded audio/video stream from the streaming media server according to the transcoding task, and start executing the transcoding task. During the transcoding process, when the transcoding task is terminated, the task management server may detect the termination activity and report a notification message of the termination of the transcoding task to the streaming media server. Thereafter, the streaming media server may determine whether the transcoding task of the audio/video stream needs to be re-created by detecting whether the connection of the audio/video stream of the transcoding task is disconnected. For example, if the connection of the audio/video stream is not disconnected, it indicates that the current task termination is an anomaly. The transcoding task of the audio/video stream may be then re-created, thereby continuing the transcoding process. If the connection of the audio/video stream is disconnected, it means that the transcoding task has completed properly, and there is no need to re-create the transcoding task. It can be seen from the above that the technical solutions provided by the present disclosure may detect and restore the abnormal transcoding tasks in time, so as to ensure that the audio/video streams may complete the decoding process in time.

Through the foregoing description of the disclosed embodiments, it is clear to those skilled in the art that the various embodiments may be implemented in the form of software with a necessary general hardware platform, or implemented in the form of hardware. In light of this understanding, the above technical solutions, or essentially the parts that contribute to the existing technologies, may take the form of software products. The computer software products may be stored in a computer-readable storage medium, such as a ROM/RAM, a magnetic disk, or an optical disc, that includes a set of instructions to direct a computing device (may be a personal computer, a server, or a network device, etc.) to implement each disclosed embodiment or part of the described methods of the disclosed embodiments.

Although the present disclosure has been described as above with reference to some preferred embodiments, these embodiments should not be constructed as limiting the present disclosure. Any modifications, equivalent replacements, and improvements made without departing from the spirit and principle of the present disclosure shall fall within the scope of the protection of the present disclosure.

What is claimed is:

1. A method for processing a transcoding task, comprising:
   receiving the transcoding task created by a streaming media server, and dispatching the transcoding task to a transcoding server to allow the transcoding server to execute the transcoding task;
   detecting an execution status of the transcoding task in the transcoding server, when it is detected that the transcoding task is terminated, feeding back, to the streaming media server, a notification message signifying a termination of a transcoding process, to allow the streaming media server to determine whether to re-create the transcoding task; and
   if the streaming media server re-creates the transcoding task, receiving the re-created transcoding task sent by the streaming media server, and dispatching the re-created transcoding task to the transcoding server to allow the transcoding server to re-execute the transcoding task.

2. The method according to claim 1, wherein the transcoding task includes an audio/video identifier, and executing the transcoding task by the transcoding server includes:
   starting, by the transcoding server, the transcoding process, and pulling, by the transcoding server, an audio/video stream corresponding to the audio/video identifier from the streaming media server through the transcoding process; and
   transcoding, by the transcoding server, the pulled audio/video stream through the transcoding process.

3. The method according to claim 1, wherein detecting the execution status of the transcoding task in the transcoding server includes:
   creating a status monitoring process, and detecting, through the status monitoring process, whether the transcoding process for executing the transcoding task in the transcoding server has exited; and
   when it is detected that the transcoding process for executing the transcoding task has exited, signifying that the transcoding task is terminated.

4. The method according to claim 1, wherein determining, by the streaming media server, whether to re-create the transcoding task includes:
   after receiving the notification message, detecting, by the streaming media server, whether a connection with the transcoding server for an audio/video stream corresponding to the transcoding task is disconnected; and
   if the connection is not disconnected, re-creating the transcoding task directed to the audio/video stream, and if the connection is disconnected, ending the transcoding task directed to the audio/video stream.

5. The method according to claim 1, after dispatching the transcoding task to the transcoding server, the method further includes:
   receiving data traffic uploaded by the transcoding server, and writing the received data traffic into a log, wherein the data traffic is used to signify data traffic of each data packet sent to the live streaming server when the transcoding server executes the transcoding task.

6. The method according to claim 1, further comprising:
   receiving a task cancellation instruction sent by the streaming media server, and forwarding the task cancellation instruction to the transcoding server to allow the transcoding server to cancel the transcoding process for executing the transcoding task.

7. The method according to claim 1, when the transcoding server executes the transcoding task, the method further includes:

detecting, by the transcoding server, a number of input channels of a to-be-transcoded audio/video stream and a number of output channels of an already transcoded audio/video stream, and comparing, by the transcoding server, the number of input channels and the number of output channels; and if the number of input channels and the number of output channels are different, exiting a current transcoding process.

8. The method according to claim 1, when the transcoding server executes the transcoding task, the method further includes:

if a to-be-transcoded audio/video stream continues a transcoding failure for a specified period of time, exiting a current transcoding process.

9. The method according to claim 1, when the transcoding server executes the transcoding task, the method further includes:

parsing configuration parameters of a current to-be-transcoded audio/video stream, and comparing currently parsed configuration parameters with configuration parameters parsed last time, if the currently parsed configuration parameters and the configuration parameters parsed last time are inconsistent, reading audio/video data currently cached in a decoder and a filter, encoding the read audio/video data, and sending the encoded audio/video data to the live streaming server; and reinitializing the decoder and the filter, and processing the to-be-transcoded audio/video stream through the reinitialized decoder and the reinitialized filter.

10. A task management server, comprising a memory and a processor, wherein the memory stores computer programs that, when executed by the processor, implement the following operations of:

receiving the transcoding task created by a streaming media server, and dispatching the transcoding task to a transcoding server to allow the transcoding server to execute the transcoding task;

detecting an execution status of the transcoding task in the transcoding server, when it is detected that the transcoding task is terminated, feeding back, to the streaming media server, a notification message signifying a termination of a transcoding process, to allow the streaming media server to determine whether to re-create the transcoding task; and if the streaming media server re-creates the transcoding task, receiving the re-created transcoding task sent by the streaming media server, and dispatching the re-created transcoding task to the transcoding server to allow the transcoding server to re-execute the transcoding task.

11. The task management server according to claim 10, wherein detecting the execution status of the transcoding task in the transcoding server includes:

creating a status monitoring process, and detecting, through the status monitoring process, whether the transcoding process for executing the transcoding task in the transcoding server has exited; and when it is detected that the transcoding process for executing the transcoding task has exited, signifying that the transcoding task is terminated.

12. The task management server according to claim 10, wherein after dispatching the transcoding task to the transcoding server, the operations further include:

receiving data traffic uploaded by the transcoding server, and writing the received data traffic into a log, wherein the data traffic is used to signify data traffic of each data packet sent to the live streaming server when the transcoding server executes the transcoding task.

13. The task management server according to claim 10, wherein the operations further include:

receiving a task cancellation instruction sent by the streaming media server, and forwarding the task cancellation instruction to the transcoding server to allow the transcoding server to cancel the transcoding process for executing the transcoding task.

14. A system for processing a transcoding task, comprising a streaming media server, a task management server, and a transcoding server, wherein:

the streaming media server is configured to create the transcoding task, send the created transcoding task to the task management server, and, when receiving a notification message, signifying a termination of the transcoding process, sent by the task management server, determine whether to re-create the transcoding task;

the task management server is configured to receive the transcoding task created by the streaming media server, dispatch the transcoding task to the transcoding server, detect an execution status of the transcoding task in the transcoding server, when it is detected that the transcoding task is terminated, feed back to the streaming media server the notification message signifying the termination of the transcoding process, if the streaming media server re-create the transcoding task, receive the re-created transcoding task sent by the media server, and dispatch the re-created transcoding task to the transcoding server; and the transcoding server is configured to execute transcoding tasks dispatched by the task management server.

15. The system according to claim 14, wherein the task management server is further configured to:

create a status monitoring process, detect, through the status monitoring process, whether the transcoding process for executing the transcoding task in the transcoding server has exited, and when it is detected that the transcoding process for executing the transcoding task has exited, signify a termination of the transcoding task.

16. The system according to claim 14, wherein the streaming media server is further configured to:

detect, after receiving the notification message, whether a connection with the transcoding server for an audio/video stream corresponding to the transcoding task is disconnected; and determine to, if the connection is not disconnected, re-create the transcoding task directed to the audio/video stream, if the connection is disconnected, end the transcoding task directed to the audio/video stream.

17. The system according to claim 14, wherein the transcoding server is further configured to:

detect a number of input channels of a to-be-transcoded audio/video stream and a number of output channels of an already transcoded audio/video stream, and compare the number of input channels and the number of the output channels; and exit a current transcoding process if the number of input channels and the number of output channels are inconsistent.

18. The system according to claim 14, wherein the transcoding server is further configured to:

parse configuration parameters from a current to-be-transcoded audio/video stream, and compare currently parsed configuration parameters with configuration parameters parsed last time, if the currently parsed configuration parameters and the configuration parameters parsed last time are inconsistent, read audio/video data currently cached in a decoder and a filter, encode the read audio/video data, and sent the encoded audio/video data to the live streaming server; and reinitialize the decoder and the filter, and process the to-be-transcoded audio/video stream using the reinitialized decoder and the reinitialized filter.

* * * * *